United States Patent

Stephens, Jr.

[15] 3,683,106

[45] Aug. 8, 1972

[54] LOW BANDWIDTH COLOR INFORMATION TRANSMISSION SYSTEM

[72] Inventor: Kenneth D. Stephens, Jr., Salt Lake City, Utah

[73] Assignee: Alberto R. Esteves, Hato Key, San Juan, P.R.

[22] Filed: March 4, 1970

[21] Appl. No.: 16,396

Related U.S. Application Data

[63] Continuation-in-part of Ser. No. 804,733, Feb. 10, 1969.

[52] U.S. Cl..........178/5.2 R, 178/5.4 CD, 178/5.4 C, 178/DIG. 3

[51] Int. Cl............................H04n 9/42, H04n 3/00

[58] Field of Search........178/5.4 CR, 5.4 CD, 5.2 R, 178/5.4 R, DIG. 3, 6.7 A; 179/2 TV

[56] References Cited

UNITED STATES PATENTS

| | | | |
|---|---|---|---|
| 2,600,868 | 6/1952 | Hales | 178/5.4 |
| 3,600,504 | 8/1971 | Reilly | 178/5.4 |
| 2,580,685 | 1/1952 | Mathes | 178/DIG. 3 |
| 2,736,762 | 2/1956 | Kell | 178/5.4 |
| 3,507,982 | 4/1970 | Sugihara | 178/5.4 |
| 2,878,309 | 3/1959 | Christensen | 178/5.4 |
| 3,524,012 | 8/1970 | Kihara | 178/5.4 |

*Primary Examiner*—Richard Murray
*Assistant Examiner*—Peter M. Pecori
*Attorney*—Lyon & Lyon

[57] ABSTRACT

There is disclosed herein an economical method and system for transmitting color video information over relatively low bandwidth transmission facilities. Original color material such as color motion pictures, stills, or slides of data, news events, or the like, or live pickup of such events, is converted to field sequential video information through the use of passive field sequential pickup and sending equipment. As an example, images from a color motion picture film are picked up by a passive field sequential color camera. The camera employs color splitting optics which separate each film frame into color primary images which are directed to a single video pickup tube. The camera provides sequential color output signals representing each frame, each frame being represented by a sequence of blue, red, and green signals. These field sequential signals, although representing discrete colors from the original film, may be handled as black and white signals which are transmitted over a conventional low bandwidth transmission facility, such as a facsimile, telephone or teletype transmission channel. The transmitted signals are received at one or more receiving locations in a region, continent or the world. These signals are then recorded on film, preferably black and white for motion pictures and color for stills, by recording equipment, such as kinescope recording apparatus, or may be recorded on video tape for subsequent film recording. The resulting film is processed; and for color motion picture rendition may be employed in a projection and conversion system wherein the sequential pictorial information from the film is picked up and then converted to conventional color television standards for transmission to color television receivers and like display equipment. Several modifications are disclosed particularly for record and playback equipment and methods.

14 Claims, 18 Drawing Figures

Figures 2A, 2B, 3A, 3B, 3C, 3D:
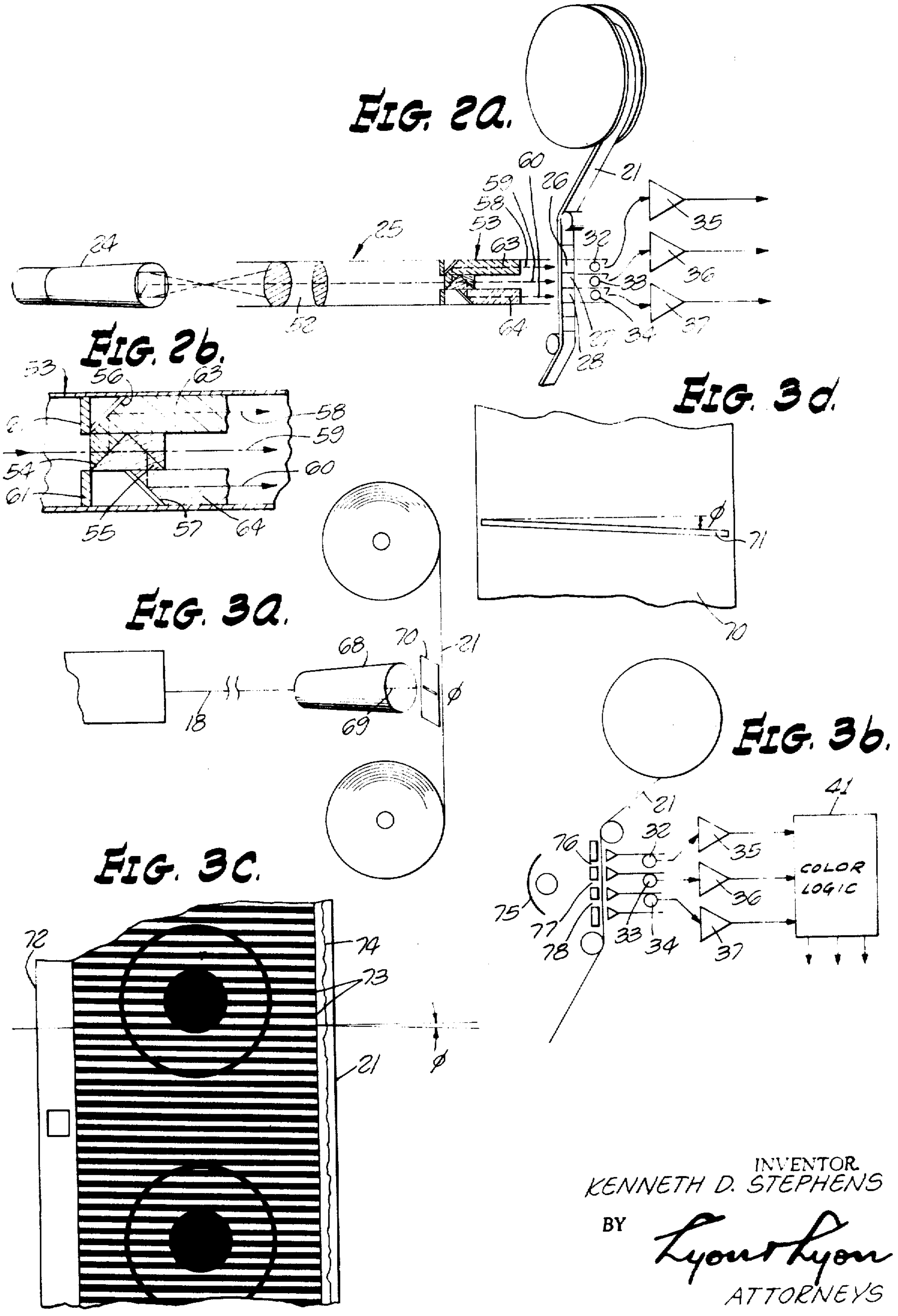

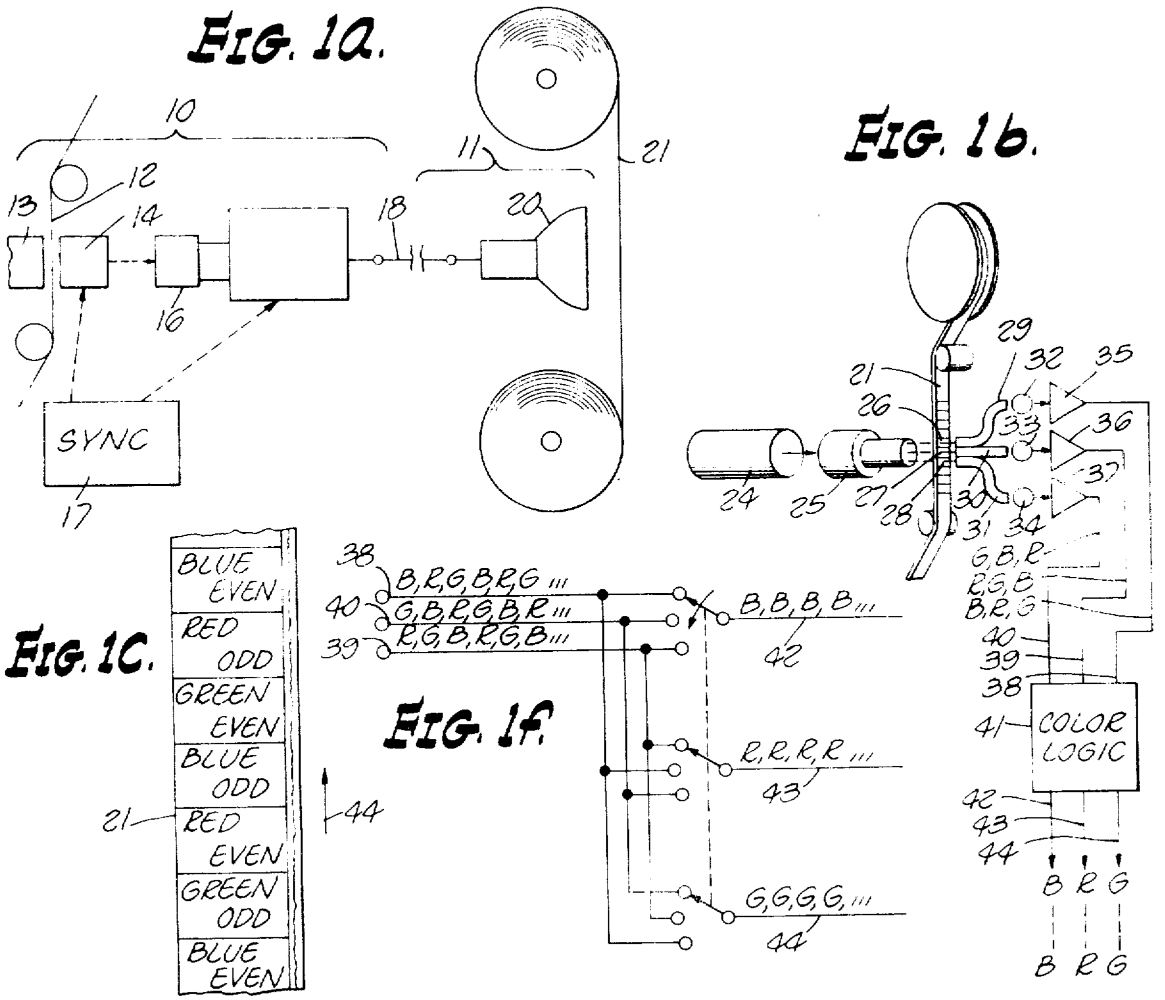
FIG. 1a. FIG. 1b. FIG. 1c. FIG. 1f.
FIG. 1d.
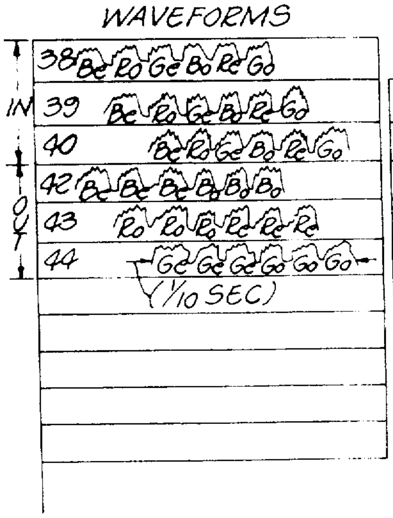
FIG. 1e.
LOGIC TABLE
| BLUE 42 | RED 43 | GREEN 44 | |
|---|---|---|---|
| 38 ON | OFF | OFF | 1ST 1/60 Be Ro Ge |
| 39 OFF | ON | OFF | |
| 40 OFF | OFF | ON | |
| 38 OFF | ON | OFF | 2ND 1/60 Ro Ge Bo |
| 39 OFF | OFF | ON | |
| 40 ON | OFF | OFF | |
| 38 OFF | OFF | ON | 3RD 1/60 Ge Bo Re |
| 39 ON | OFF | OFF | |
| 40 OFF | ON | OFF | |
INVENTOR
KENNETH D. STEPHENS
BY Lyon & Lyon
ATTORNEYS INVENTOR.
KENNETH D. STEPHENS
BY Lyon & Lyon
ATTORNEYS INVENTOR.
KENNETH D. STEPHENS
BY Lyon & Lyon
ATTORNEYS INVENTOR.
KENNETH D. STEPHENS
BY Lyon & Lyon
ATTORNEYS

LOW BANDWIDTH COLOR INFORMATION TRANSMISSION SYSTEM

CROSS-REFERENCE TO RELATED APPLICATIONS

This application is a continuation-in-part of U. S. application Ser. No. 804,733 entitled "Sequential Color Television System" filed Feb. 10, 1969, in the name of the present inventor and assigned to the assignee of the present application. Reference is made to U. S. application Ser. No. 522,623 entitled "Recording and/or Reproducing High Frequency Signals" filed Jan. 24, 1966, now U.S. Pat. No. 3,539,712, in the name of the present inventor and assigned to the assignee of the present application.

BACKGROUND OF THE INVENTION

This invention relates to a relatively economical method and system for transmitting color video information. Although not intending to be limited thereby, the present concepts are discussed herein for providing delivery of color film shorts and pictorial information of news events, facsimiles, data, and the like, originating at various centers, to remote television stations and/or receiving facilities and terminals throughout a region, country, or the world. In this regard, present delivery of information of this nature generally is by mail, and still pictures are transmitted to an extent by conventional facsimile transmission means usually incorporating mechanical converting methods. Because of the time involved in mailing such information, as is well known, motion pictures of the news events are stale by the time they are received by the receiving stations in many instances. It is particularly desirable for television stations to be able to broadcast color film shorts on the day of occurrence. Of course, color television broadcast quality lines throughout the country may be leased. Such lines have a 4.5 to 5 MHz bandwidth and the cost thereof for real time usage essentially is prohibitive. Accordingly, it is desirable to provide a relatively low cost system of color information transmission over transmitting facilites, of substantially reduced bandwidth, reduced equalization, phase correction, and so forth, as compared to the usual high bandwidth, high quality and expensive color television and data transmission facilities, or to utilize data compression and expansion techniques to reduce the time necessary to utilize such high bandwidth lines.

SUMMARY OF THE INVENTION

In one presently preferred embodiment of the inventive concepts disclosed herein, color film is picked up by a field sequential color camera, preferably a passive field sequential camera as disclosed in said copending application Ser. No. 804,733. The passive camera includes color splitting optics and a single video pickup tube. The scansion with the tube is the same as the blue, green and red pickup methods well known in the art. This camera converts each color still or film frame into field sequential color representing signals. For example, each frame is represented by a vertically stacked series of three image areas respectively representing the blue, red and green content of each original color frame. The content of the three image areas is converted by the pickup tube and scan system to field sequential color signals of blue, red and green. The signals may be termed black and white signals which represent color information. These signals are then transmitted over a relatively low bandwidth facility, such as a medium speed facsimile system or a communication "channel" or "group" (nominally 3 kHz and 48 kHz respectively) to a receiving facility either with or without employment of data compression or expansion.

At the receiving facility a kinescope recording apparatus records the received motion picture or live color signals on black and white color component frames. Alternatively, the received signals may be recorded by a video recorder and later recorded on film, which may be color film for "still" information. The film is processed, motion pictures then being played back by picking up the film frames and generating a sequence of color representing signals. Playback may be accomplished in several ways, such as by a cathode ray tube flying spot scanner or the like, preferably simultaneously scanning all three color representing film segments. The resulting signals are gated to provide continuous outputs which may then be used for local transmission and display on home color television receivers.

In this manner, the original color information can be transmitted relatively economically from a central location to various remote locations, such as local television stations and terminals for public or private use. A transmission facility having a bandwidth of 50 to 100 kilohertz, along with a data expansion ratio (scan slowdown) of 10 or 15 to 1, can be economically used for the purpose of color motion picture transmission according to the present invention. A like facility with bandwidth of 3 kilohertz (voice channel) may similarly be used with expansion ratios typically of 3,000:1 for the transmission of full-color "stills." Each television station then recovers the transmitted signals by recording the same on film as noted above, and subsequently simultaneously recovers the original primary color signals and broadcasts the recovered color information in a conventional manner to its viewers.

Currently, news events and the like are recorded on color film or video tape, and sent or transmitted as noted earlier. Either method has several disadvantages. With color film, substantial time and precise technical conditions are involved in development for ultimate use. A number of copies must be made. The film must be physically sent as by mail, messenger service, or the like, to the point of use.

With the second current method, it should be noted that present color camera/video tape systems are large and cumbersome, and the costs thereof are phenomenally high as compared to color film. Power requirements are relatively large. Video retrieval at the receiving location requires either a shipping or mailing delay, as with film, or extremely costly use of color balanced broad bandwidth (over 4.5 megahertz) cable and microwave systems.

On the other hand, relatively economical transmission facilities can be employed with the present inventive method. Processing of the film, which is black and white film, at the receiving station requires approximately fifteen minutes total development time including chemical developer solution and fix. Mail or shipment is not required inasmuch as the information is electronically scanned, and transmitted to the receiving station. The system can operate from any suitable input device or source, such as a color film projector, live studio, video tape recorder and so forth. The pickup equipment, and storage equipment if used, can be relatively small and portable. The cost involved varies depending upon which of the inventive approaches disclosed herein are used. Where, for example, color film serves as the input, the cost at the film originating facility is as high as with current color film systems, but less than color camera/video tape systems presently in use. However, time and transmission savings are substantial. Moreover, color pickup and conversion equipment can be made to cost a fraction of conventional color scanning and encoding means. Typically, the power requirements in the field are low. "Real-time" information can be transmitted to the receiving facility with as little as one-ninth bandwidth requirement at a proportional savings in cost. Data expansion/compression techniques can be easily employed for transmission over proportionately narrower bandwidth lines. For example, a ten to one expansion ratio allows use of a 50–100 kilohertz line, although 10 times the transmission period is involved.

Accordingly, a principal object of the present invention is to enable color information transmission with low bandwidth facilities.

It is a further object of this invention to provide an economical color transmission system.

Another object of this invention is to provide a novel manner of transmitting stills, data (such as computer readouts, identification information, scientific analysis, and so forth), or live information.

An additional object of this invention is to provide an economical method of transmission of news events and the like in color.

Another object of this invention is to provide an improved system for transmitting color information.

A further object is to provide method and apparatus for a transmission service with private and public terminals.

These and other objects and features of the present invention will become better understood through a consideration of the following description taken in conjunction with the drawings in which:

FIGS. 1*a* and 1*b* illustrate a color information transmitting and receiving system, for enabling pickup, transmission, recording and playback of the color data or information, according to the present invention;

FIGS. 1*c*, 1*d* and 1*e* are illustrations for facilitating an understanding of the system of FIGS. 1*a* and 1*b;*

FIG. 1*f* is a simplified diagram of a logic gating circuit of FIG. 1*b;*

FIGS. 2*a* and 2*b* are a more detailed illustration of the playback system optics of FIG. 1*b;*

FIG. 3*a* is an alternative recording system which may be used in lieu of that of FIG. 1*a;*

FIG. 3*b* is an alternative playback system;

FIGS. 3*c* and 3*d* respectively illustrate the film and a mask involved in the arrangement of FIG. 3*a;*

Figure 4A:
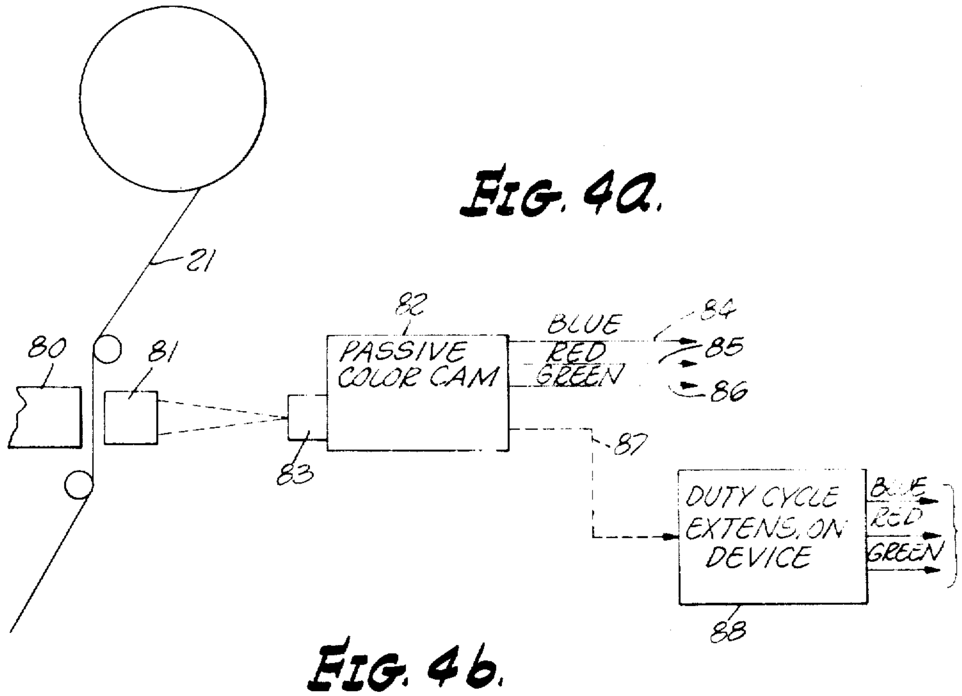
Figure 4B:
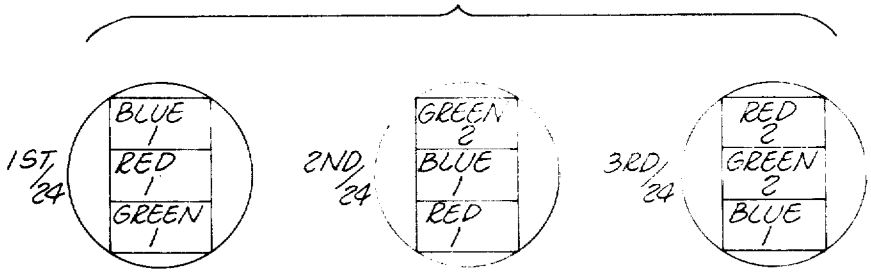

FIGS. 4*a* and 4*b* illustrate further playback alternatives

Figure 5A:
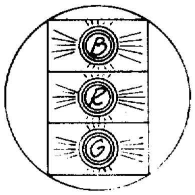
Figure 5B:
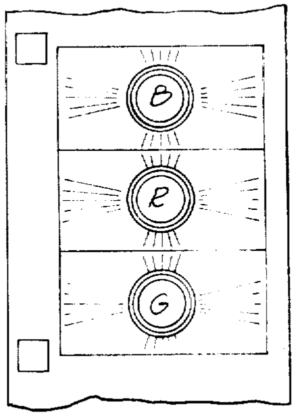

FIGS. 5*a* and 5*b* illustrate other alternative playback arrangements; and

Figure 6A:
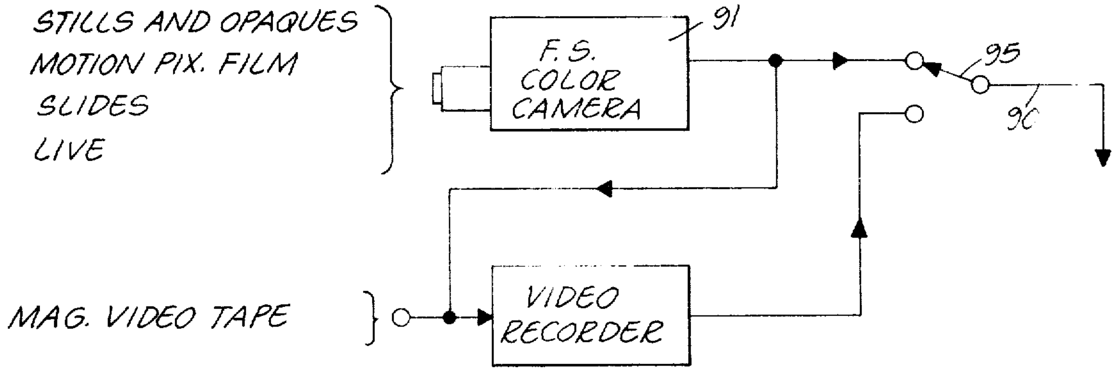
Figure 6B:
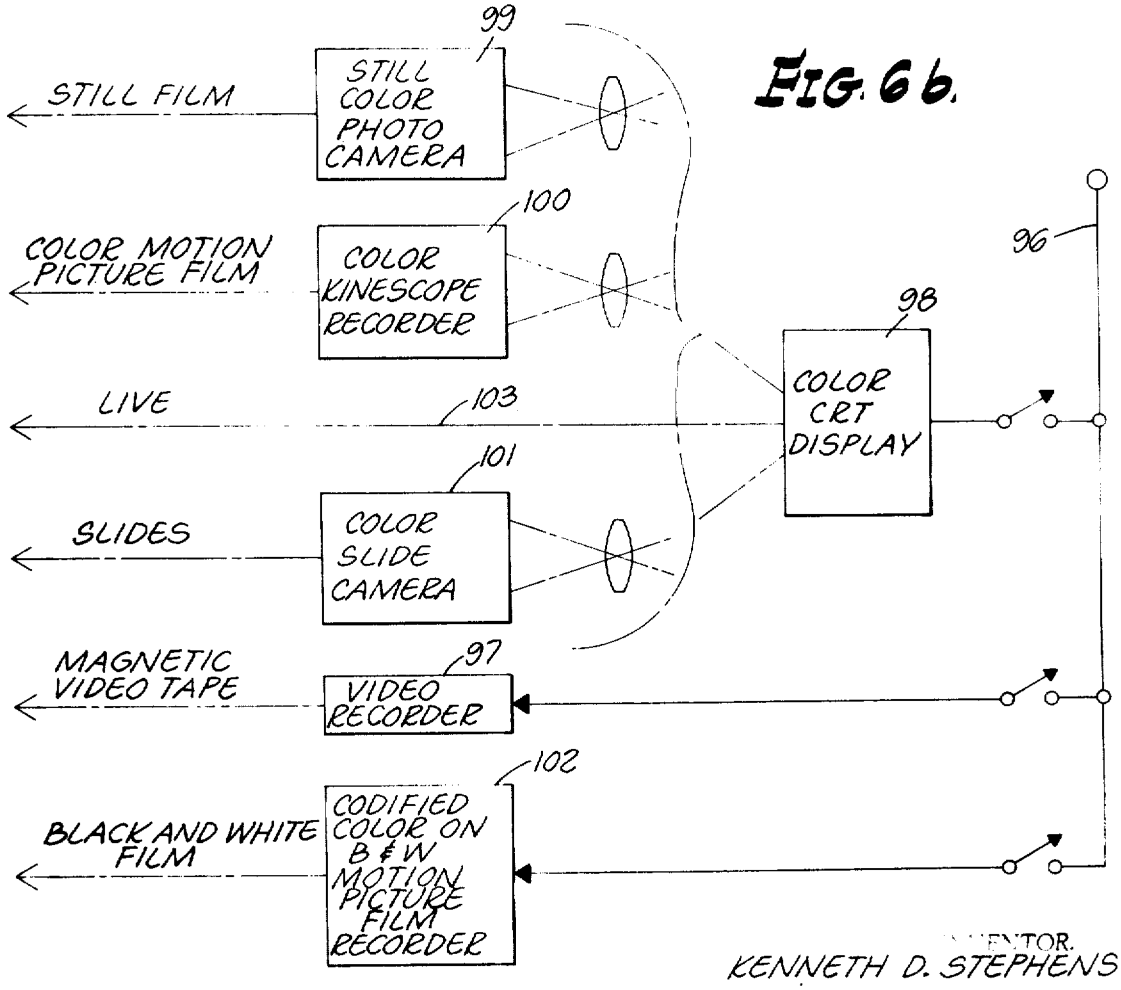

FIGS. 6*a* and 6*b* illustrate an exemplary input and output terminal.

Turning now to the drawings, FIG. 1*a* illustrates a pickup and transmission facility 10 communicating with a receiving facility 11. Original source material, such as 16 millimeter, 24 frame per second color movie film 12 is passed between a lamp 13 and lens 14 of a conventional projector, and images therefrom are picked up by a field sequential color camera 15. The film projector preferably is a continuous projector which utilizes moving prisms or the like to stroboscopically freeze picture information without requiring the use of a shutter and pull down mechanism, as is well known. The camera 15 preferably is a passive field sequential camera as described in said copending application Ser. No. 804,733.

The camera includes an optical splitting system 16 which preferably is a three color dichroic color selective optics system which splits each color film frame into three separate stacked images as described in said application Ser. No. 804,733 and as will be described subsequently in more detail. The images are picked up by a conventional black and white pickup tube within the camera, and the camera provides field sequential output signals sequentially representing three color image components of red, green and blue. The left-hand illustration in FIGS. 4*b* and 5*a* is exemplary of the manner in which three primary color images from one color film frame are split and stacked upon the face of the pickup tube of the camera. Prism optics similar to that shown in FIGS. 2*a*–2*b* can be used to split and stack the images. The pickup tube of the camera 15 scans the three primary color image components as a complete raster, preferably containing 262 ½ or more lines, typically 787 ½ lines per complete scan (3 × 262 ½ for the three image components). If it is desired to permit a camera vertical scan frequency of one-sixtieth of a second, each color image of the three image array, containing the three vertically stacked color images, is scanned in one one-hundred eightieth of a second so that the three images are successively scanned cumulatively in one-sixtieth of a second.

A projector/camera synchronizing system 17 may be employed to maintain sync between the projector and the camera. If data expansion or compression is used, in which case the rates of operation of the projector and camera are different, the sync system 17 is used. A slower camera scan rate is used for narrower bandwidth transmission. For example, for transmission at 100 kilohertz, data expansion of 10 times may be employed thereby requiring a proportional ten to one slowdown of the projector. Conversely, for transmission over a 4.5 megahertz bandwidth situation, data compression of 4 times may be employed similarly requiring a proportional 4 to 1 speedup of the projector.

Such projector speed changes typically can be accomplished through the use of D.C. motors driven by motor drive amplifiers set to "sense" the speed desired relative to normal, as through manual adjustment and/or film frame counting circuits, e.g., lamp/photocell arrangements tabulating sprocket holes/sec. and so forth; or the employment of A.C. synchronous drive motor fed by motor drive amplifiers in turn driven by a variable frequency oscillator likewise set by manual control and/or frame counters as compared with proper submultiple of camera horizontal sweep frequency. It should be noted that the input source may be "live" and in real time, but data expansion/compression techniques cannot be applied in this instance unless the information is first recorded and then similarly slowed down upon playback.

The output of the camera 15 is connected to a transmission path 18 which may be a network of lines serving appropriate receiving stations in a region, a continent, or the world. Before interfacing with the transmission path 18, the sequential color video signal train from the camera 15 is passed through well-known line driving and transmission circuits (not shown) in a conventional manner. Similarly, appropriate receiving equipment for interfacing with the output of the transmission path 18 at each receiving station 11 is used. Alternatively, the output signals from the camera 15 may be magnetically recorded and stored for any desired length of time before applying such signals to the transmission path 18.

The signals reaching the receiving station 11 may be stored, typically on magnetic tape. However, the signals ultimately are routed to a kinescope display device 20, the output images of which are focused by a suitable conventional lens system (not shown) on respective single frame portions of unexposed film 21. It is preferable to synchronize film pull-down, shutter motion and film travel speed such that each complete kinescope raster (typically a 262 ½ line field of information representing one color component) exposes a single frame of the film 21 before pull-down action brings the next unexposed frame before the kinescope recorder. Pulldown is phased so as to occur during the kinescope vertical retrace blanking period. This may be accomplished by manual adjustment or, presently preferred, by a vertical rate pulse "trigger" which releases the film for travel during that period. Adjacent frame portions are serially exposed, such as a blue representing even field, a red representing odd field, green even field, blue odd field, red even field, green odd field, and so forth, as depicted in FIG. 1*c*. The film 21 can be relatively low cost, simply-processed black and white film, and even negative film if desired.

The exposed film is processed in a conventional manner, and for subsequent playback is threaded on a modified projector system as illustrated in FIG. 1*b*. This projector system employs a cathode ray tube flying spot scanner 24 as a light source in a manner similar to some systems presently in use. However, interposed between the scanner 24 and film 21, where a simple objective lens system normally would be used in conventional systems, a more complex light relay optics device 25 is employed. The optics device 25 super-imposes an in-focus CRT raster image simultaneously on three adjacent, vertically stacked film frames, such as frames 26–28 shown in FIG. 1*b*. This optics device may be like the color spliting optics 16 in the camera 15, and like that illustrated in FIGS. 2*a*–2*b* which will be described in detail subsequently. Currently known in the present art, where a single film frame is scanned at a time, the raster information (modified by film density) is optically relayed to the photo surface of a suitable photoactive device, such as a photo-electric cell or photomultiplier tube. The output of such conventional devices is a video signal and is appropriately amplified and processed for transmission and display. On the other hand, with the present system three such relay systems designated 29 through 31 and photodevices designated 32 through 34 are employed, it being understood that optical isolation between each is provided in a conventional manner. Thus, it will be apparent that three rasters are focused upon respective frames 26 through 28. The resulting images from the three frames are relayed to the photodevices 32 through 34. The light relay system 29–31 may include fiber optics or the like.

Three output amplifiers 35 through 37 are respectively connected to the photodevices 32 through 34. The outputs of the amplifiers 35 through 37 are three independent video output signals corresponding to the respective film frames which are simultaneously scanned by the CRT scanner 24. Hence, the amplifier 35 provides output signals representing the upper frame 26, the amplifier 36 provides output signals representing the middle frame 27, and so forth, it being understood that the film frames are sequenced past the relay and photo device system to obtain meaningful color-representative information trains.

From the foregoing, it will be apparent that at any given time each video output from the amplifiers 35 through 37 is representative of different color information, such as blue, red and green from the respective amplifiers 35 through 37. Furthermore, one frame period thereafter (typically one-sixtieth second) each amplifier will be concerned with the color one frame removed from the former situation, such as red, green and blue from respective amplifiers 35 through 37. However, signals for each color component are at all times eminating from one of the three amplifiers 35 through 37. Through the use of appropriate logic and analog gating circuits, continuous output signals corresponding to each of the three colors will be present simultaneously. For this purpose output lines 38–40 from the amplifiers 35 through 37 are connected to a color logic circuit 41 to provide three simultaneous red, blue and green output signals on respective output lines 42 through 44. FIG. 1d illustrates typical waveforms, each over a one-tenth second period at the inputs and outputs of the color logic circuit 41, the first three waveforms representing the inputs on lines 38–40 and the last three waveforms representing the continuous outputs on lines 42–44. FIG. 1e is a truth table illustrating the operation of gates within the color logic circuit 41 to provide the continuous outputs. FIG. 1f illustrates a mechanical switch analogy of the color logic 41 gating so as to properly switch the signals from the amplifiers 35–37 to the outputs 42–44. It will be apparent that the switching or gating is synchronized with the advance of the film 21.

Considering the operation in more detail, looking at the film 21 in FIG. 1*c*, it will be apparent that if the film 21 is progressing in the direction of the arrow 44, the amplifiers 35 through 37 will respectively provide outputs of blue even, red odd, and green even signals. When the film 21 moves one frame, the amplifiers 35 through 37 will respectively provide output signals representing red odd, green even and blue odd signals. In the next succeeding frame position, the amplifiers 35 through 37 respectively provide output signals for green even, blue odd and red even. It thus will be apparent that each of the three inputs to the color logic circuit 41 is at all times providing one of the three color component signals. Hence, the color logic circuit 41 merely includes a plurality of analog gates which are controlled to pass signals from the inputs to the outputs in a time sequence in accordance with the logic table shown in FIG. 1*e*. In this manner the sequential waveforms on lines 38 through 40 in FIG. 1d are simply converted to the continuous waveforms on lines 42 through 44 as shown in FIG. 1. These continuous waveforms may be encoded in a conventional manner to provide a conventional color signal train, such as a standard NTSC signal, or directed to a suitable display device accepting blue, red and green video inputs. The resulting signal train may be transmitted in a conventional manner by the television transmission equipment at the film receiving facility (which typically is a television station) so that the originally filmed scenes on the film 12 (or live pickup, slides, and so forth) can be viewed on conventional home color television receivers.

FIGS. 2*a*–2*b* illustrate the optics system of the playback arrangement of FIG. 1*b*. The cathode ray tube flying spot scanner 24 provides a raster which is applied to the optical splitting system 25. The optical splitting system 25 includes a field and objective lens system 52 in front of the face of the scanner 24. A dichroic prism assembly 53 which may be color selective is interposed between the lens system 52 and the film 21. The prism system 53 is shown in enlarged form in FIG. 2*b*, and is a beam splitting dichroic prism assembly which, for example, comprises a blue reflecting surface 54 and a green reflecting surface 55 used in conjunction with mirror surfaces 56 and 57 whereby the original raster image from scanner 24 is separated into three segregated color raster images, blue 58, red 59, and green 60. A mask 61 is provided so that light from the scanner 24 only strikes the intermediate prisms of the assembly having the surfaces 54 and 55. The length and material of the prisms 63 and 64 is chosen to ensure that the blue, red and green light reach the film 21 at essentially the same point in time. Such a color selective optics system 25 is more completely described in said copending application Ser. No. 804,733 and is preferred over a more simple polychromatic three-way beam splitting device inasmuch as conventional color film can as well be color-selectively displayed as set forth below.

There are two methods of operation for the playback arrangement illustrated in FIG. 2. First, the scanner 24 may scan a complete conventional raster which in turn is focused separately on three vertically adjacent film frames 26 through 28. The amplifiers 35 through 37 are connected to the color logic circuit 41 of FIG. 1*b* in this case where black and white field sequential film is being played back. Second, the scanner 24 may scan only a single horizontal line which is similarly focused on three vertically adjacent film frames. If the first approach is used, the film is projected to the photo devices 32–34 with a standard pulldown mechanism and shutter, full scansion taking place one or more times before pull-down which is made to occur in the vertical retrace interval as mentioned in conjunction with the description of FIG. 1, and if the second approach is used the film motion is continuous. This is more completely explained in the discussion of FIG. 3 below. However, the second approach usually requires more film frames per second, typically 60 instead of 24.

As stated above, the color splitting optics 25 provides the advantage that standard color film may be scanned and displayed, in which case each of the amplifiers 35 through 37 always provides as an output a particular color component signal. For example, the amplifier 35 may always provide blue output signals, the amplifier 36 red output signals and the amplifier 37 green output signals. In this case the color logic 41 is not needed. Thus, the arrangement illustrated in FIG. 2 allows both the projection of the field sequential black and white film as explained in the discussion of FIG. 1b wherein signals are ultimately transmitted for reception by conventional color receivers or, alternatively, may be readily used for the pickup of color film for transmission.

FIG. 3*a* illustrates an alternative record system and FIG. 3*b* illustrates an alternative playback system for the black and white film involved in the system of FIGS. 1*a* and 1b. In the arrangement of FIGS. 1*a* and 1*b*, the video information is recorded on the film 21 by raster exposure of individual frames, the recording system employing appropriate shutter and pull-down mechanisms. In the arrangement of FIG. 3*a*, a kinescope 68 is scanned to radiate only a single intensity-modulated "horizontal" television line 69 which is further narrowed and made geometrically straight through an optical mask 70 containing a narrow slit 71. The slit 71 is arranged at a slight angle $\phi$ from true horizontal, corresponding to typical television vertical scan interaction. In this case, the film 21 passes the slit 71 continuously effecting a writing action from the scanner 68 to the surface of the film 21. The film when developed will contain full intensity modulated raster information representative of the original video from the transmission path 18. The angle $\phi$ of the slit 71 from horizontal represents the difference between a line perpendicular to film edge 72 and the horizontal scan line of the raster. FIG. 3*b* better illustrates the mask 70, and FIG. 3*c* schematically illustrates intensity modulated optical scan lines 73 on the film 21. Typically, 262 ½ scan lines are used per single color field representing film frame. A track 74 for sound, and if desired sync, also may be provided on the film 21, the latter, for example, by means of an ultrasonic audio burst representative segment identifying the transition between green and blue. A test pattern is simulated in FIG. 3*c*, and a vertical retrace blanking interval is indicated at 75.

Playback of the processed film 21 is effected through a continuous motion projection system as shown in FIG. 3*b* containing a bright light source 75 directed through three narrow slits 76 through 78. Each slit is one line wide and vertically spaced one film frame apart. These slits are similar in all respects to the narrow slit 71 in the optical mask 70, except they are perfectly horizontal (i.e., perpendicular to the direction of the film advance). Thus, as the recorded raster lines 73 on the film pass by the slits 76–78, a natural and continuous scan action takes place and can be picked up by a bank of optically isolated photoelectric cells 32–34. The outputs of the photoelectric cells 32 through 34 are coupled through amplifiers 33 through 37 to the color logic circuit 41 the same as that explained in connection with FIG. 1*b*. Similarly, the chart of waveforms and color logic gating sequences is the same as illustrated in FIGS. 1*d*–1*e*. The arrangement of FIGS. 3*a* and 3*b* has the advantage of direct line-by-line raster retrieval of the information originally transmitted, a relatively simple and low cost playback projection system (although initial precision setup adjustments must be made for the various slits), and the use of a bright light source in the playback projector, eliminating the need for a flying spot scanner and comparatively complex relay optics. However, preferably a faster film frame shuttle speed, usually 60 frames per second, is used as opposed to typically 24 frames per second.

Table I below is a comprehensive chart illustrating information carrying possibilities at various bandwidths, expansion/compression ratios, and film/picture/television field ratios. For instance, at 6 MHz a 300 by 525 line, one minute film segment can be transmitted in 15 seconds; at 1 MHz a 200 by 525 line segment can be transmitted in real time (one minute); at 100 kHz a similar 200 by 525 line, 1 minute film segment takes 10 minutes to transmit; or a 50 kHz with 15 minutes transmission provides a resolution of 150 by 525 lines. These examples are for the standard film frame to television field ratio of 24 to 60. The first three examples in Table I illustrate compression using high bandwidth lines, and the remaining examples illustrate either real time or expansion. Table II provides examples for color still picture transmissions. Some bandwidths noted closely correspond to the communications grouping as indicated in the notes at the bottom of the tables.

TABLE I

| Bandwidth | Expansion or (compression) | Resolution: Vert. (TV lines) | Horiz. | Ratio:film/TV field |
|---|---|---|---|---|
| 6 MHz | (4:1) × 1/4 | 300 | 525 | 24/60 |
| 4.5 MHz | (3:1) × 1/3 | 300 | 525 | 24/60 |
| 4.5 MHz | (3:1) × 1/3 | 360 | 525 | 20/60 |
| 4.5 MHz | 1:1 real time | 360 | 525 | 60/60 |
| 3 MHz | 1:1 real time | 480 | 525 | 30/60 |
| 2 MHz | 1:1 real time | 480 | 525 | 20/60 |
| 2 MHz | 1:1 real time | 400 | 525 | 24/60 |
| 1.5 MHz | 1:1 real time | 360 | 525 | 20/60 |
| 1.5 MHz | 1:1 real time | 300 | 525 | 24/60 |
| 1 MHz[4] | 1:1 real time | 240 | 525 | 20/60 |
| 1 MHz[4] | 1:1 real time | 200 | 525 | 24/60 |
| 500 kHz | 1:1 real time | 120 | 525 | 20/60 |
| 500 kHz | 1:2 – × 2 | 200 | 525 | 24/60 |
| 300 kHz[3] | 1:3 – × 3 | 216 | 525 | 20/60 |
| 200 kHz | × 5 | 240 | 525 | 20/60 |
| 200 kHz | × 5 | 200 | 525 | 24/60 |
| 100 kHz | × 10 | 240 | 525 | 20/60 |
| 100 kHz | × 10 | 200 | 525 | 24/60 |
| 60 kHz[2] | × 10 | 144 | 525 | 20/60 |
| 60 kHz[2] | × 15 | 180 | 525 | 24/60 |
| 50 kHz[2] | × 15 | 180 | 525 | 20/60 |
| 50 kHz[2] | × 15 | 150 | 525 | 24/60 |
| 30 kHz | × 20 | 144 | 525 | 20/60 |
| 30 kHz | × 20 | 240 | 263 | 24/60 |
| 20 kHz | × 20 | 192 | 263 | 20/60 |
| 20 kHz | × 20 | 160 | 263 | 24/60 |
| 10 kHz | × 20 | 115 | 263 | 20/60 |
| 12 kHz[1] | × 20 | 192 | 263 | 12/60 |
| 10 kHz | × 20 | 160 | 263 | 12/60 |

TABLE II

| Bandwidth | Transmission Time | Resolution: Vert. (TV lines) | Horiz. |
|---|---|---|---|
| 3 kHz[0] | 16¼ min. | 1000 | 1000 |
| 3 kHz[0] | 99 sec. | 320 | 320 |
| 12 kHz[1] | 4 min. | 1000 | 1000 |
| 12 kHz[1] | 25 sec. | 320 | 320 |
| 48 kHz[2] | 1 min. | 1000 | 1000 |
| 48 kHz[2] | 6 sec. | 320 | 320 |

(Notes for Tables I and II)
[0]Channel (Voice Communication, 3–4 kHz)
[1]Subgroup (4 × 3 kHz communication channels)
[2]Group (4 or 5 × Subgroups)
3Supergroup (5 × Groups)
4Hypergroup (3 × Supergroups)

FIGS. 4*a* and 4*b* illustrate further playback alternatives. In FIG. 4*a*, a standard projector having a light source 80 and lens 81 projects the film 21 a single frame at a time to a passive field sequential color camera 82 using a conventional objective lens 83 rather than the color splitting optics described earlier for the camera 15 of FIG. 1*a*. The projector is a conventional one employing a shutter and pull-down mechanism. However, at 24 or even 60 frames per second, severe flicker will be encountered in the resulting camera output signals. Thus, a film speed of at least 150 frames per second is desirable to achieve flicker free sequential output signals. This, of course, involves a field rate for the camera 82 of 150 hertz, but this merely requires a change in vertical sweep rate which will be apparent to those skilled in the art, examples of which are more fully described in said copending application Ser. No. 804,733. The camera 82 can provide field sequential separate color output signals on lines 84 through 86 (like the outputs from the amplifiers 35–37) for monitoring purposes. Preferably, however, the camera output as indicated by dashed line 87 may be applied to a duty cycle extension device 88 which may be a magnetic disk or tape recorder for extending the duty cycle of each of the three field sequential signals. Such a duty cycle extension device is more fully described in said U.S. Pat. No. 3,539,712. The output of the device 88 is a continuous color signal output which, if compatible scan rates are chosen (60 film frames per second), may be applied to the input of an NTSC color encoder, or other suitable device for providing the standard NTSC color signal for transmission or recording.

In an alternative arrangement, the projector gate of FIG. 4*a* may be enlarged to simultaneously project three frames from the film 21 to the camera 82. In this case, the camera scan aspect ratio is four by nine, horizontal to vertical, rather than the conventional 4 by 3, horizontal to vertical, aspect ratio. The scan can be at any desired rate, such as 180 color fields per second (60 hertz vertical sweep) to eliminate flicker. Color gating logic in the camera is advanced one segment every film frame change, such as every one twenty-fourth second as illustrated in FIG. 4*b*. This figure illustrates image patterns on the face of a black and white pickup tube in camera 82. From FIG. 4*b*, it will be seen that three frames at a time are viewed by the camera, and the film is advanced one frame at a time. It will be apparent that the three outputs of the camera likewise are similarly gated.

Since the lag of the pickup tube tends to reduce color channel purity as the field rate is increased, in a presently preferred alternative the codified film can be advanced three frames at a time, thereby eliminating relatively complex color identification circuitry for gating logic. This enables a particular color frame to always exist at the top of the stack of three frames as seen in FIG. 5*a*. Three frames thus are advanced at a time to ensure that this particular color (blue in FIG. 5*a*) remains at the top of the stack. This approach overcomes the color channel contamination problems occasioned by the lag of typical black and white pickup tubes. Similarly, each film sprocket interval, usually referred to as a film frame, may be exposed containing a complete color "stack" with or without anamorphic optics to utilize full film width as depicted in FIG. 5*b*. As in the description of FIG. 4 above, duty cycle extension may be employed or color field rates chosen for flicker elimination and/or standards compatibility. One significant advantage of either embodiment depicted by FIG. 5 relates to the fact that camera scansion need not be at the film frame rate. Therefore, for example, any standard projector utilized for television film information will work in this embodiment, FIG. 5*b*, requiring little or no modification.

FIGS. 6*a* and 6*b* depict in block form two sections of a typical terminal station for public use similar to station for cables, facsimile, TWX, and so forth. FIG. 6*a* represents an input section which transforms incoming color data into electronic signals suitable for transmission on a line 90. One or more cameras 91 are used to transform various inputs, such as, (1) stills and opaques, (2) motion picture film, (3) slides and transparencies, (4) live transmissions, as from a booth arranged for such a purpose. Furthermore, one or more magnetic video recorders 94 are used to (1) record such input material for storage and/or later transmission, (2) accept comparably recorded video material compatible with its standard for transmission over line 90. A switch 95 is schematically shown to represent alternative inputs to line 90 from either directly scanned or magnetically stored sources.

FIG. 6*b* likewise depicts an output (receiving) section complementary to the input section represented by FIG. 6*a*. Data arriving on line 96 (which may coincide with line 90) may be routed to suitable magnetic storage means 97, and/or plural display means 98, which may be high quality kinescope color display devices, respectively coupled by conventional optical means to provide through devices 99 through 101 color still film, color motion picture film, or color slides. The film and slide recording devices include one of several conventional cameras incorporating automatic exposure and shutter trigger means, the trigger means being actuated by an incoming tone or the like. A second display device 102 allows recording of color codified black and white motion picture film in one of the ways described earlier in conjunction with the discussion of FIGS. 1–5. Complementing the above-mentioned live booth transmission facility is a similar direct display receiving facility indicated by a line 103 wherein a color television display 98 relays transmitted material to one or more viewers. A single booth for viewers may contain both transmitting and receiving facilities, essentially becoming a two-way color television communication terminal.

Recording of signals in the present system may take place in several locations throughout the system. The original color slides, stills, opaques and motion picture film may be projected into the camera 15 of FIG. 6a, or the camera can pick up a scene "live," with the output of the camera being recorded on a magnetic recorder. In the latter case (live), the recording takes place, of course, in "real time" and a response time of at least 0.5 MHz is necessary, but this is still many times less than current on-the-spot pickup/transmission and pickup/recording techniques. Alternatively, audio or data recorders employing fixed head recording with relatively fast (e.g., 50 to 100 inches per second) head to tape speed may be used. Furthermore, the information may be recorded at the point of reception (FIG. 6*b*) as noted earlier. Upon reception, the video information has already been compressed or expanded to the desired bandwidth. The video information can be stored on an audio or data type magnetic recording unit with a speed such as 30 to 50 inches per second for a 50 to 100 kHz bandwidth, or 7 ½ inches per second or even less for narrower bandwidths as may be encountered in color picture and data transmission. Alternatively, storage at the point of reception can be performed, along with duty cycle extension upon playback in the manner described in said U.S. Pat. No. 3,539,712. The information recorded at the point of reception is then applied to the kinescope recorder system of the nature of one of these described earlier, or applied to a conventional colorplexer if the recorder is equipped for real time video playback employing full duty cycle extension.

The present embodiments of this invention are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of transmitting color data to a remote location over a transmission path having a relatively low bandwidth compared to a transmission path for conveying the same effective amount of simultaneous color video information within a given period of time, said relatively low bandwidth being achieved through use of a relatively low scan rate in picking up said color data and the subsequent converting of field sequential data to a continuous color output comprising
   - electronically scanning and transforming said color data to field sequential color representing signals,
   - transmitting said color representing signals to a receiving station,
   - recording said color representing signals on black and white film and processing said film,
   - playing back said processed film and picking up field sequential color data therefrom to provide a field sequential data output, and
   - converting said field sequential data output to a continuous color output suitable for transmission by a continuous color video transmission system.

2. A method as in claim 1 wherein
   the original color data to be transmitted is in the form of color film.

3. A method as in claim 2 wherein
   said color film is motion picture film.

4. A method as in claim 1 wherein
   the original color data is in the form of a live color scene.

5. A method as in claim 1 wherein the original color data to be transmitted is first recorded before scanning and transformation thereof to said field sequential color representing signals.

6. A method as in claim 1 wherein said color representing signals are recorded on said black and white film in a repetitive sequence of three primary component images.

7. A method as in claim 6 wherein said three color component images are blue, red and green.

8. A method as in claim 1 wherein said field sequential color representing images from said processed film are picked up three frames at a time, each frame representing a primary component image of the original color information.

9. A method as in claim 6 wherein said field sequential color data from said processed film are picked up three frames at a time, each frame representing a primary component image of the original color data.

10. Apparatus for transmitting color data over a transmission path having a relatively low bandwidth compared to a transmission path for conveying the same effective amount of simultaneous color video information within a given period of time comprising field sequential camera means for receiving said color data and splitting said color data into respective color components, said camera means having pickup tube means for converting said color components into field sequential color component representing signals, a low bandwidth data transmission path, said camera means being coupled to said transmission path for applying said field sequential color component representing signals thereto, receiving means coupled to another end of said transmission path for receiving said color component representing signals, said receiving means comprising source means and film recording means for recording said color component representing signals on black and white film for subsequent playback of said black and white film, projection means for projecting frames of said black and white film to optical-electrical pickup means for converting recorded data from said frames of film back into field sequential color component representing data, and conversion means coupled with said optical-electrical means for converting said color component data to continuous color signals for transmission by color video transmitting equipment, said relatively low bandwidth being achieved through a relatively low scanning rate by said camera means and the converting of said color component data by said conversion means.

11. Apparatus as in claim 10 wherein said recording means includes a flying spot scanner for recording frames on said black and white film, and said projection means includes optical means for simultaneously projecting three frames of said black and white film to said optical-electrical means.

12. Apparatus as in claim 10 wherein said recording means includes flying spot scanning means for sequentially recording modulated intensity lines on said black and white film, and said playback means comprises source means for directing light through a plurality of slits for projection of a like plurality of adjacent frames of said film.

13. Apparatus as in claim 10 wherein said projection means comprises a source of light and color splitting optics means including a plurality of color selective dichroic surfaces for simultaneously projecting plural frames of said black and white film to said optical-electrical means.

14. Apparatus for receiving color data transmitted over a transmission path having a relatively low bandwidth compared to a transmission path for conveying the same effective amount of simultaneous color video information within a given period of time, said relatively low bandwidth being achieved through use of a relatively low scan rate in picking up color data to be transmitted and the converting of field sequential color component data by conversion means, comprising receiving means for receiving field sequential color component representing signals, said receiving means comprising source means and film recording means for recording said color component representing signals on black and white film for subsequent playback of said black and white film, projection means for projecting frames of said black and white film to optical-electrical pickup means for converting recorded data from said frames of film back into field sequential color component representing data, said projection means including source means and color splitting optics means comprising a plurality of color selective dichroic surfaces for simultaneously projecting an in focus array of plural frames of said black and white film to said optical-electrical means, and conversion means coupled with said optical-electrical means for converting said color component data to continuous color signals for transmission by color video transmitting equipment.

* * * * *